United States Patent [19]

Johnson

[11] Patent Number: 4,916,822
[45] Date of Patent: Apr. 17, 1990

[54] ANGLE AND DISTANCE MEASURING INSTRUMENT

[76] Inventor: Robert U. Johnson, 2937 Westbrook Dr., Apt. 213, Building A, Ft. Wayne, Ind. 46805

[21] Appl. No.: 278,587

[22] Filed: Dec. 1, 1988

[51] Int. Cl.⁴ .......................... G01B 3/06; G01B 3/56
[52] U.S. Cl. ........................................ 33/458; 33/421; 33/451; 33/462; 33/463; 33/465; 33/495; 33/538
[58] Field of Search ................. 33/451, 452, 453, 420, 33/421, 456, 458, 461, 462, 463, 465, 473, 495, 534, 538

[56] References Cited

U.S. PATENT DOCUMENTS

| | | | |
|---|---|---|---|
| 1,215,441 | 2/1917 | Walker | 33/452 |
| 1,264,531 | 4/1918 | Lambert | 33/496 |
| 1,289,047 | 12/1918 | Hall | 33/458 |
| 1,468,598 | 9/1923 | Libby | 33/495 |
| 1,559,386 | 10/1925 | Valentine | 33/452 |
| 1,825,759 | 10/1931 | Smith | 33/462 |
| 1,999,105 | 4/1935 | Milla | 33/453 |
| 2,160,820 | 6/1939 | Bensen | 33/453 |
| 2,507,460 | 5/1950 | Schacht | 33/453 |
| 4,097,999 | 7/1978 | Nowlin | 33/500 |
| 4,535,542 | 8/1985 | Liu et al. | 33/452 |

FOREIGN PATENT DOCUMENTS 279681 11/1927 United Kingdom ................. 33/420

OTHER PUBLICATIONS

McDowell, E., Abstract of Serial No. 634,131, filed Dec. 10, 1945, published in O.G. Aug. 15, 1950.

Primary Examiner—William A. Cuchlinski, Jr.
Assistant Examiner—Diego F. F. Guiterrez
Attorney, Agent, or Firm—Pearne, Gordon, McCoy & Granger

[57] ABSTRACT

An angle measuring instrument provides two straight arms connected at one end for relative pivotal movement. A telescoping assembly includes two elongated telescoping members each providing a free end. The free end of one telescoping member is pivotally connected to one arm and the free end of the other telescoping member is connected to the other arm. The telescoping members provide scales indicating the angular position between the two arms, the distance between the pivots of the free ends of the telescoping members on the arms, and a correction to be added to or subtracted from measurements along the length of the arms to establish distances from the corner which is being measured. The two arms can pivot through a full 360 degrees relative to each other, permitting the measurement of inside and outside corners of all sizes. A straight edge is removably mounted on one of the arms when measuring outside corners. A level is provided to establish the position of one of said arms relative to a horizontal direction.

20 Claims, 8 Drawing Sheets

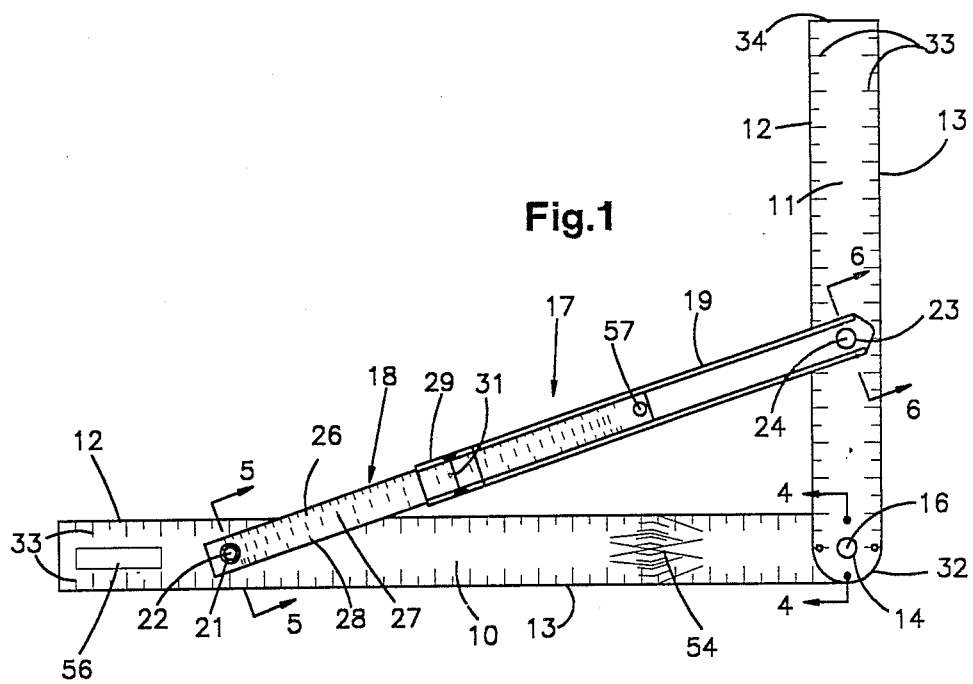
Fig.1
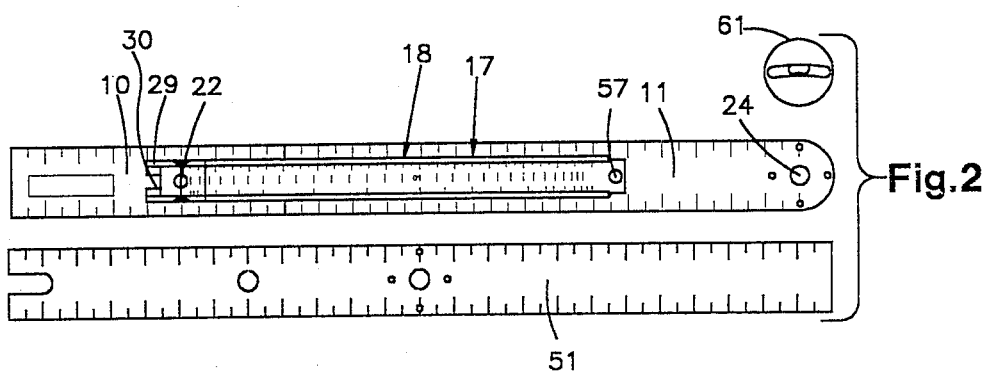
Fig.1a
Fig.2

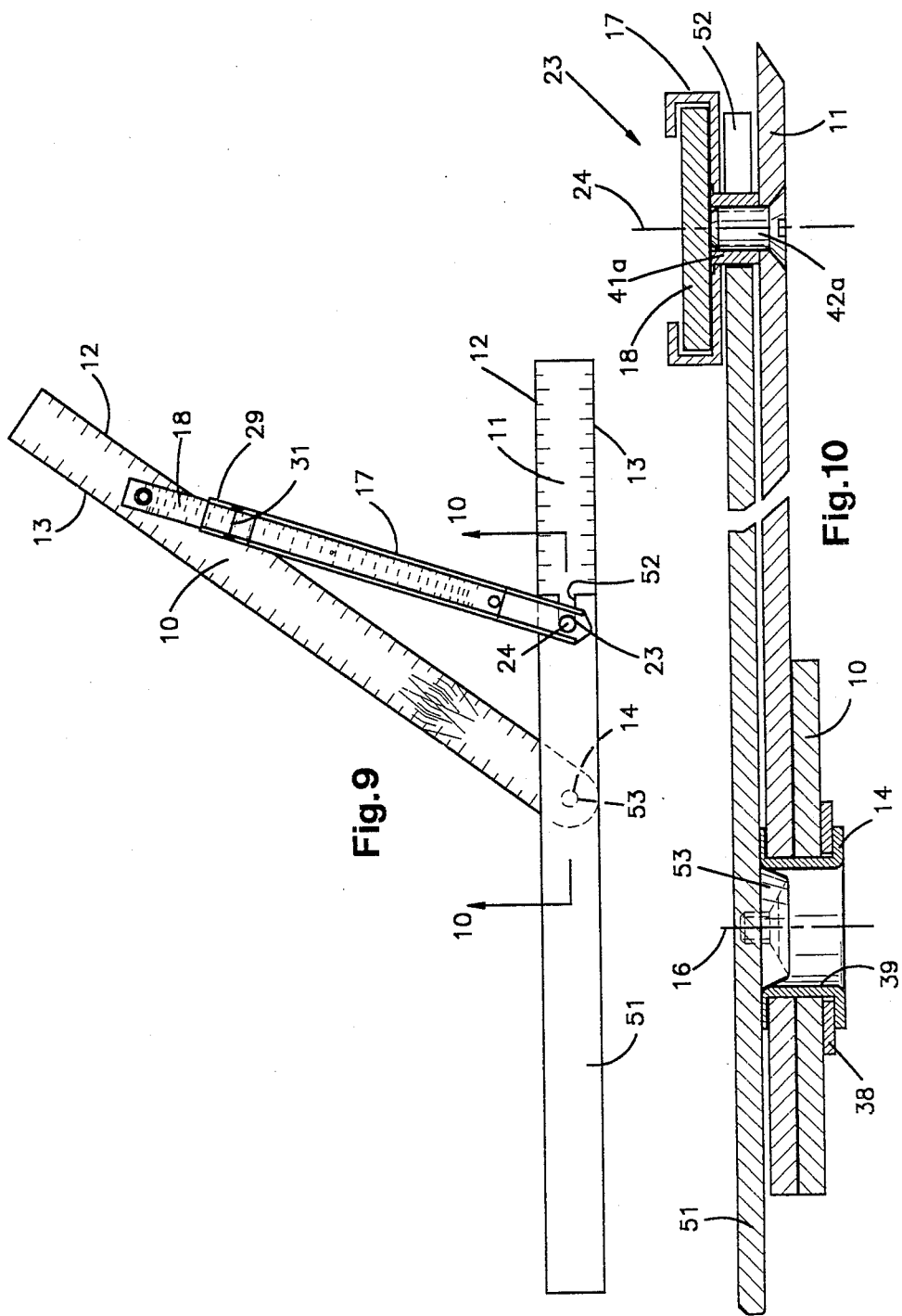

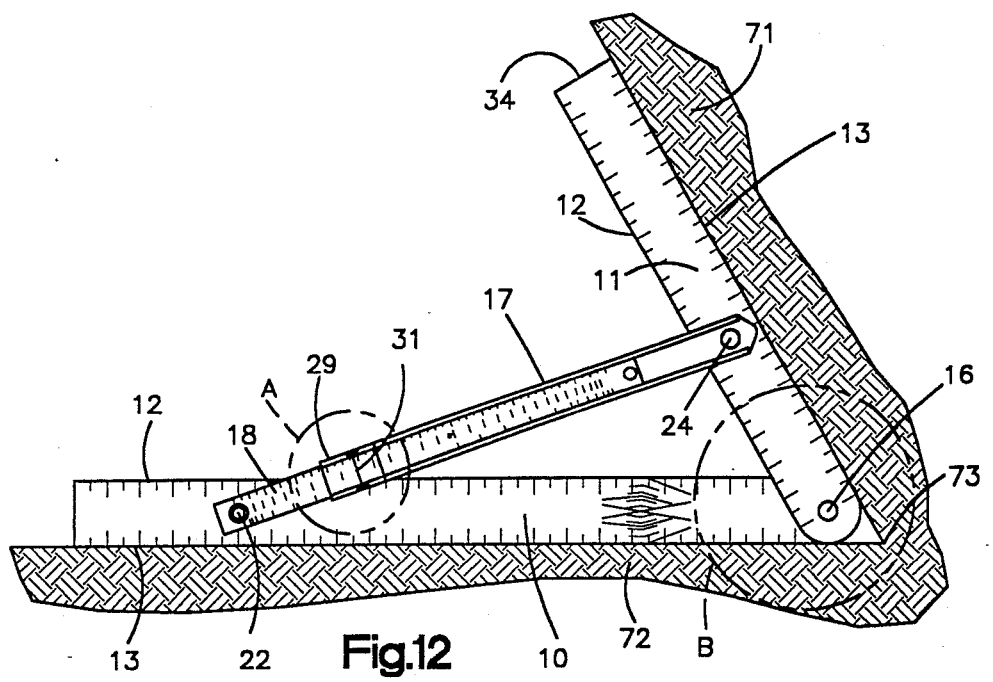
Fig.12
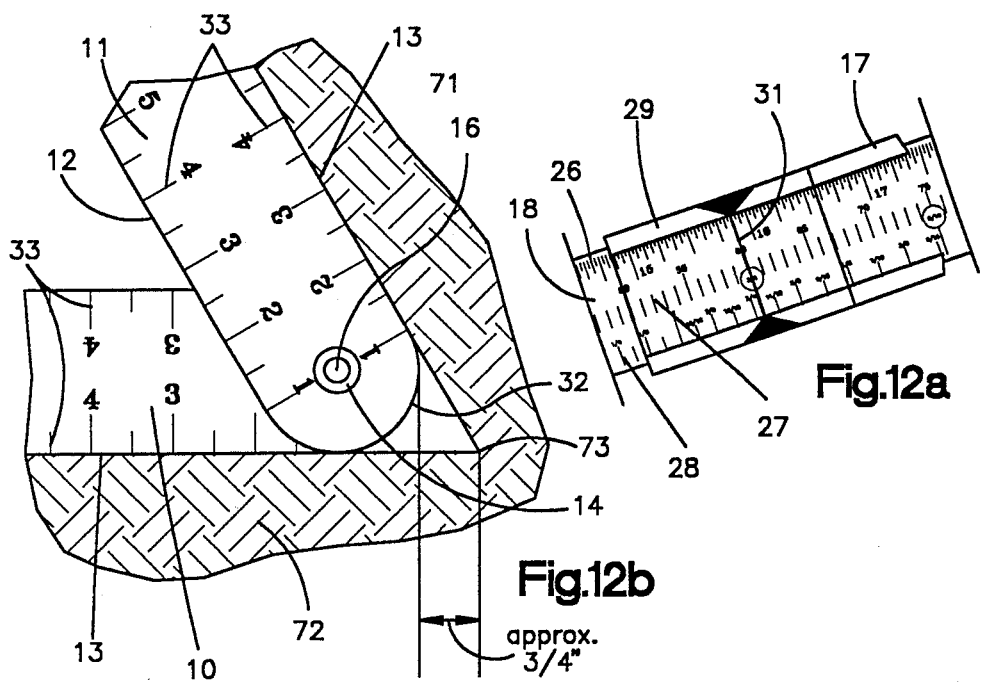
Fig.12b
Fig.12a
approx. 3/4"

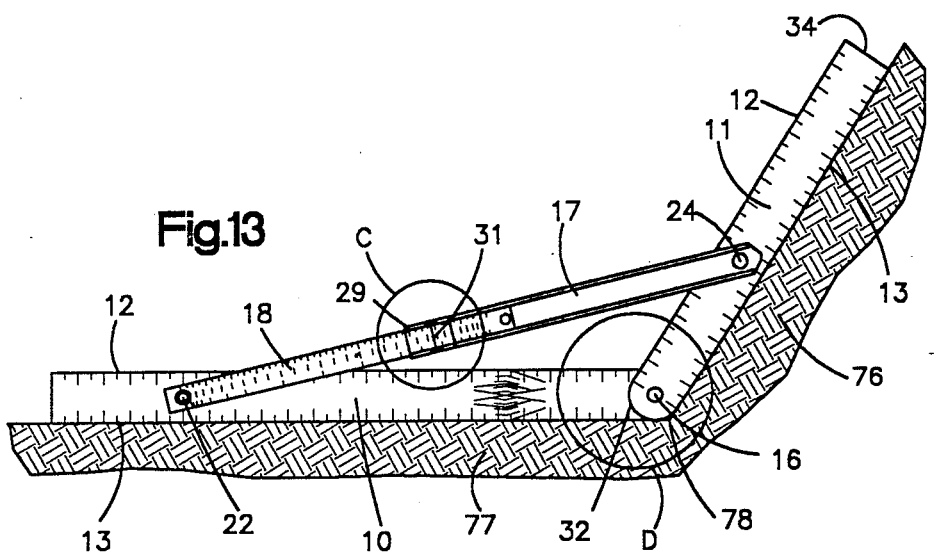
Fig.13
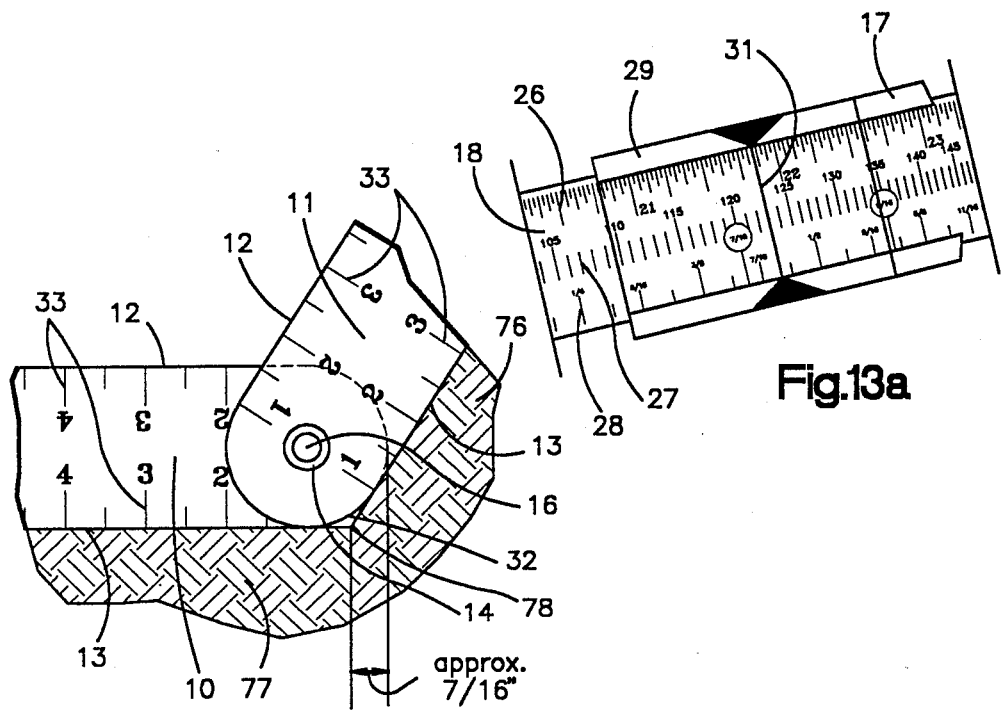
Fig.13a
Fig.13b

ANGLE AND DISTANCE MEASURING INSTRUMENT

BACKGROUND OF THE INVENTION

This invention relates generally to measuring instruments, and more particularly to a novel and improved instrument for accurately measuring angles and distances, and which is particularly suited for field measurement and layout work.

PRIOR ART

The present invention is directed to an instrument which can be used in the field to accurately measure or establish angles and distances from corners, and which can be folded into a compact unit when not in use. Examples of prior art devices of this general type are illustrated in U.S. Pat. Nos. 124,222; 363,491; 577,709; and 1,849,128.

SUMMARY OF THE INVENTION

The present invention provides a simple instrument for measuring or establishing angles and distances from corners and the like with accuracy. Such instrument is sturdy and can be folded into a compact unit for storage when not in use. Further, it can be used with a high degree of accuracy by relatively unskilled people.

The instrument of this invention is particularly suited for use in the field to measure existing structures or for laying out construction. For example, it is often necessary to make an accurate plan or drawing of an existing room or rooms so that custom fixtures, such as cabinets, counters, and the like, can be fabricated to accurately fit in a particular location. If the corners of walls against which the custom fixture must fit are not exactly square, and if this is not determined prior to fabrication, a proper fit may not be provided. Similarly, when an architect is inspecting a building to establish that it conforms to the design, it is often desirable to be able to accurately measure angles and distances in the structure.

The illustrated embodiment provides two arms having straight edges pivotally connected at one end, and each providing distance indicia, such as inch or metric marks, extending from the pivot. A telescoping assembly, consisting of two elongated telescoping members connected for telescoping movement, is pivotally connected at its ends to the two arms. The telescoping assembly cooperates with the arms to form a triangle.

When the two arms are pivoted relative to each other, changing the angle therebetween, the length of the telescoping assembly changes, causing corresponding relative longitudinal movement between the two telescoping members. One of the telescoping members is provided with three scales, and the other telescoping member is provided with a cursor having a hairline or reference mark.

By reading the scales at the hairline, the user can accurately determine the angle between the two arms in degrees, the distance between the pivots at the ends of the telescoping assembly, and also the amount to be added or subtracted from the measurement along the two arms to establish the distance from the corner being measured.

The illustrated embodiment provides relative pivotal movement between the two straight edge members through a full 360 degrees. With the basic instrument, it is possible to accurately measure the inside corner angles at all angles from zero degrees to 180 degrees. Further, a removable accessory straight edge is provided to measure outside corner angles of all sizes from 180 degrees to 360 degrees. Still further, when a spirit level is installed on the unit, the instrument can accurately measure angles of inclination relative to the vertical direction or the horizonal direction.

Further, the instrument provides a structure in which the distance between the pivot of one end of the telescoping assembly from the pivot connecting one of the two arms is at least about three times the distance of the pivot of the other end of the telescoping assembly on the other arm from the pivot between the two arms. This relationship permits the instrument to measure all angles and to fold into a compact unit for storage.

These and other aspects of this invention are illustrated in the accompanying drawings, and are more fully described in the following specification.

BRIEF DESCRIPTION OF THE DRAWINGS

FIG. 1 illustrates the instrument in a position in which the two straight arms extend at right angles relative to each other to form a 90-degree angle therebetween;

FIG. 1a illustrates an accessory straight edge which is mounted on the instrument to measure outside angles;

FIG. 2 illustrates the instrument folded for storage along with the straight edge and level accessories which may be mounted on the instrument;

FIG. 9 illustrates the instrument with the straight edge accessories installed thereon;

FIG. 10 is an enlarged cross section taken along line 10—10 of FIG. 9;

FIG. 12 illustrates the instrument used to measure an acute angle of a corner between two planar surfaces such as walls;

FIG. 12a is a greatly enlarged view of the cursor and scale readings within the circle A of FIG. 12;

FIG. 12b is a greatly enlarged view of the corner and the two arms within the circle B of FIG. 12;

FIG. 13 illustrates the use of the instrument to measure an inside corner between two walls intersecting at an obtuse angle;

FIG. 13a is an enlarged, fragmentary view of the portion within the circle C of FIG. 13;

FIG. 13b is an enlarged, fragmentary view of the portion within the circle D of FIG. 13;

DETAILED DESCRIPTION OF THE DRAWINGS

Figure 3:
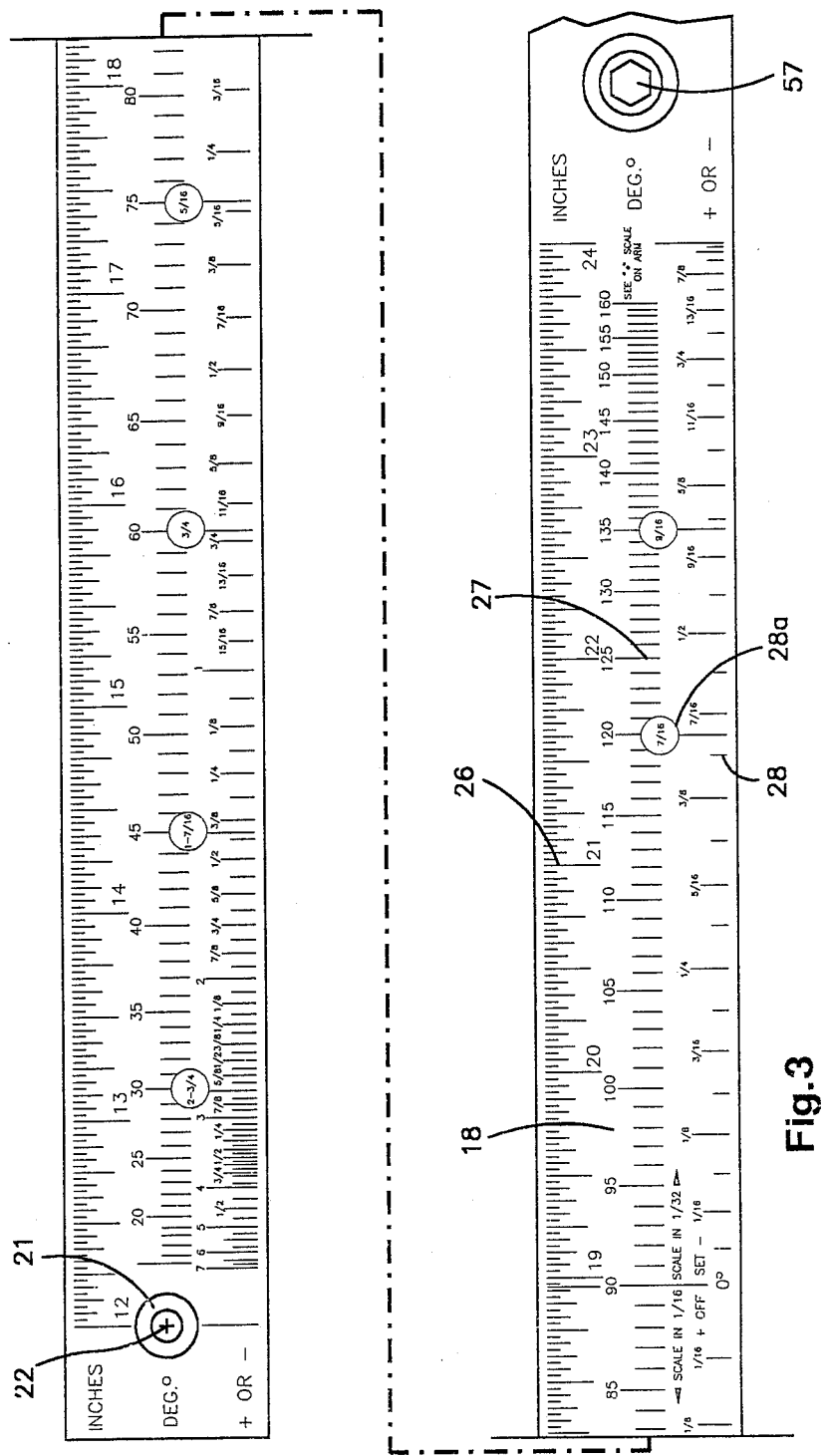
FIG. 3 is an enlarged, broken view of the three scales provided on one of the telescoping members.

FIG. 1 illustrates one preferred embodiment of an instrument incorporating this invention in which the instrument is positioned to provide a right or 90-degree angle. The instrument includes a long arm 10 and a short arm 11. Each of the arms 10 and 11 is an elongated member providing parallel and opposed straight edges 12 and 13. The two arms are connected at one end by a pivot 14 for relative rotational movement about the pivot axis 16 thereof.

The instrument also provides a telescoping assembly 17 which includes first and second elongated, telescoping members 18 and 19. The free end of the telescoping member 18 is connected by a pivot 21 to the long arm 10 for relative pivotal movement about the pivot axis 22 thereof. The other of the telescoping members 19 is connected at its free end to the short arm 11 by a third pivot 23 for pivotal movement relative thereto about the pivot axis 24 thereof for relative rotation about such pivot axis.

As illustrated in FIG. 3, the telescoping member 18 is provided with indicia thereon providing three separate scales 26, 27, and 28. Mounted on the telescoping member 19 is a cursor 29 having a hairline or reference line 31 overlying the scales 26, 27, and 28 printed on the telescoping member 18. This cursor is carried by the telescoping member 19 back and forth along the length of the telescoping member 18 when the two arms 10 and 11 are pivoted back and forth around the pivot axis 16. The first scale 26 printed on the telescoping member 18 cooperates with the cursor 29 to indicate the distance between the two pivot axes 22 and 24. The second scale 27 cooperates with the cursor 29 to indicate the angle in degrees between the two arms 10 and 11. The purpose and use of the third scale 28 are described below.

The arms 10 and 11 are also provided with indicia establishing the distance along the respective arms from their ends connected by the pivot 14. In the illustrated embodiment, the two arms are two inches wide and the pivot axis 16 is located on each arm one inch back from the adjacent end of the arm. Further, each of the arms is provided with a semicircular end 32 having a radius of curvature of one inch and a center of curvature coincident with the pivot axis 16. Therefore, each of the arms 10 and 11 is provided with a semicircular end 32 which tangentially intersects the associated straight edges 12 and 13.

In the illustrated embodiment, each of the arms is provided with a scale 33 printed along each edge 12 and 13 in inches from the end adjacent to the pivot 14. Since the extremity of the semicircular end 32 on each of the arms 11 and 12 has a radius of curvature of one inch, the scales 33 along each arm provide a one-inch mark aligned with the pivot axis 16. It should be understood, however, that the arms need not necessarily be two inches wide, and that the scales 33 can be other than inch scales, such as metric scales.

Because the ends 32 of the two arms 10 and 11 are curved, a corner of a structure at the intersection between two planar surfaces, such as walls, is not actually engaged, and such corner, which is a projection of the side edges 13 of the two arms 10 and 11, is not aligned with the extremities of the semicircular ends 32 except when the corners being measured intersect at 90 degrees. The third scale 28 is provided to indicate the amount which should be added or subtracted from the scales 33 of the two arms to establish the distance of a given point from the corner. The manner in which this third scale 28 is used in connection with the cursor 29 is described in detail below.

The short arm 11 has a length selected so that the end 34 of the short arm is spaced from the pivot 14 by a distance less than the spacing between the two pivots 14 and 21 so that the instrument may be folded to a compact position in which the short arm 11 extends along the long arm 10 beneath the telescoping assembly 17, as illustrated in FIG. 2. In such folded position the entire instrument has a size equal to the size of the long arm 10 and a very compact condition is provided in which the instrument can be easily stored when not in use. For example, the instrument may be stored in a carpenter's or other tradesman's tool box in a convenient manner, so long as the tool box is as long as the long arm 10.

When the two arms 10 and 11 overlap in the zero angle position, the hairline 31 is located at one end of the scales 26, 27, and 28, and when the two arms 10 and 11 are pivoted to the 180-degree position in which they are in alignment in an extended position, the hairline 31 is at the other end of such scales. Therefore, the scales 26, 27, and 28 have a length equal to twice the spacing between the pivot axes 16 and 24.

Since the telescoping members 18 and 19 must have a length at least twice the distance between the pivots 16 and 24, the spacing between the pivots 16 and 22 must be at least about three times the spacing between the pivot axes 16 and 24 to prevent the telescoping member from projecting beyond the edge 13 of the short arm 11 as the two arms approach the zero degree position.

As mentioned above, the illustrated embodiment provides arms 10 and 11 two inches wide. The pivots are located so that the various pivot axes 16, 22, and 24 are positioned along the centerlines of the two associated arms 10 and 11. Further, the telescoping member 18 is one inch wide and the telescoping member 19 provides a channel (described below) sized to receive the telescoping member 18, and is therefore slightly more than one inch wide. The long arm 10 is 24 inches long and the short arm 11 is 16 inches long. The pivot axis 22 is 19 inches from the end 32 of the long arm 10, resulting in a spacing of 18 inches between the pivot axes 16 and 22. The pivot axis 24 is seven inches from the end 32 of the short arm 11 and, therefore, the spacing between the pivot axes 16 and 24 is six inches. Therefore, the spacing between the pivot axes 16 and 22 is three times the spacing between the pivot axes 16 and 24.

The telescoping member 18 is 13⅝ inches long, and the pivot 21 is positioned so that its pivot axis 22 is ⅝ inch from the adjacent end of such telescoping member. The telescoping member 19 is 14 5/16 inches long, and the pivot 23 is located so that its pivot axis 24 is spaced one inch from the adjacent end thereof. The cursor 29 is mounted on the telescoping member 19 so that its hairline 31 is 12 inches from the pivot axis 24. Consequently, when the instrument is folded to a zero degree position, the hairline 31 is located along the axis 22. In order to permit movement of the cursor to such position, the telescoping member 19 is provided with a notch 30 (illustrated in FIG. 5) at its end, permitting the end of the telescoping member 19 to extend beyond the pivot 21 in the zero degree position.

Because the two telescoping members 18 and 19 extend from their respective pivots 21 and 23 a distance greater than 12 inches, an overlap is provided to maintain the telescoping relationship even when the instrument arms are rotated to a 180-degree position relative to each other.

With this structure, the ends of the telescoping assembly never project beyond the edges 12 and 13 of the associated arms 10 and 11, even when the two arms are pivoted relative to each other through a full 360 degrees. Further, with this structure, free pivotal movement of the two arms 10 and 11 through 360 degrees is permitted. However, it is desirable to provide a spacing between the two pivot axes 16 and 24 which is as large as possible with respect to the spacing between the pivot axes 16 and 22 while still not exceeding the 3:1 ratio of length, so that a maximum amount of relative telescoping movement is provided between the telescoping members to provide as much accuracy as possible in the readings of the scales 26, 27, and 28.

Figure 4:
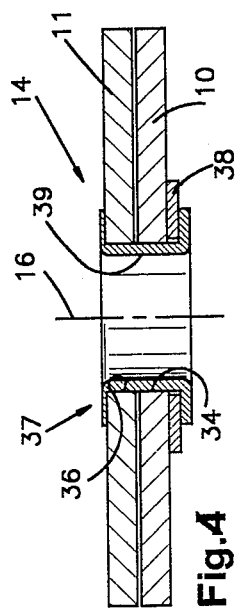
FIG. 4 is an enlarged, fragmentary cross section taken along line 4—4 of FIG. 1.

FIG. 4 is an enlarged, fragmentary section illustrating the preferred structure of the pivot 14. The arms 10 and 11 are provided with a circular opening 34 and 36, respectively, which is coaxial with the axis 16. A tubular grommet 37 extends through the openings 34 and 36 and also through a grommet washer 38 to provide the pivot 16. The two ends of the grommet are flared outwardly and operate to hold the two arms 10 and 11 together. Preferably, the grommet has a relatively large diameter to provide strength for the pivot 14 and also to provide a central opening 39 for the mounting of accessories, as discussed in detail below. In the illustrated embodiment, the grommet 37 provides a circular opening 39 about one-half inch in diameter.

Figure 5:
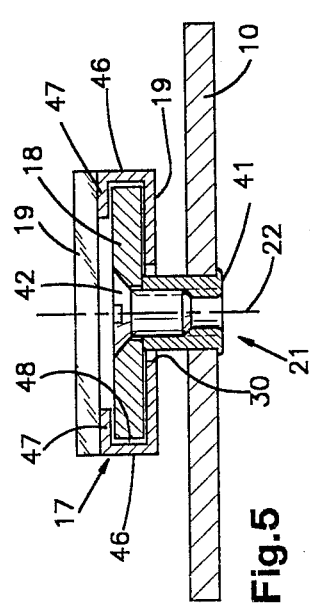
FIG. 5 is an enlarged, fragmentary cross section taken along line 5—5 of FIG. 1.

FIG. 5 illustrates the structural detail of the pivot 21. Mounted in the arms 10 and 11 at the pivot 21 is an internally threaded tube nut 41 having an exterior toothlike surface which bites into the surface of the arm through which it extends. The tube nut is sized so that it extends up from the surface of the associated arm a distance at least equal to the thickness of the arm 11. A screw 42 extends through an associated opening in the arm 18 or 19, and into the associated tube nut 41 to complete the pivotal structure of the pivot 21. Preferably, the screw 42 is countersunk so that it does not extend above the surface of the associated telescoping member 18.

Figure 6:
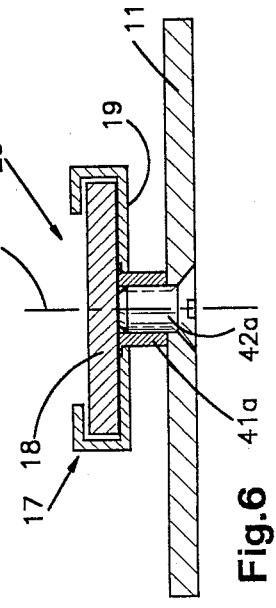
FIG. 6 is an enlarged, fragmentary cross section taken along line 6—6 of FIG. 1.

The pivot 23, illustrated in FIG. 6, provides a similar structure including a tube nut 41a mounted in the telescoping member 19 and a screw 42a extending through the short arm 11 into the tube nut.

The telescoping connection between the two telescoping members 18 of the telescoping assembly 17 is best illustrated in FIG. 5. The telescoping arm 19 is formed with upstanding flanges 46 having inturned lips 47 at their extremities so that the telescoping member 19 defines a longitudinally extending channel 48 which is open along its upper side between the lips 47. The channel 48 is sized to closely fit and receive the telescoping member 18. The three scales 26, 27, and 28 printed on the surface of the telescoping member 18 are exposed to view through the opening between the two lips 47. The cursor 29 bridges across the opening above the telescoping member 18. With this simple structure, a telescoping connection is provided between the two telescoping members 18 and 19, permitting them to move longitudinally back and forth relative to each other.

Because the tube nut 41 of the pivot 21 spaces the telescoping assembly 17 up away from the surface of the long arm 12, clearance is provided to permit the end 34 of the short arm 11 to move in under the telescoping assembly when the instrument is folded.

In some instances, it is desired to measure an outside corner between two planar intersecting surfaces. In order to permit such measurements, an accessory straight edge 51 is provided which is removably mounted on the instrument. Such straight edge 51 is formed with a longitudinally extending notch 52 sized to closely fit the pivot 23 between the short arm 11 and the telescoping member 19. Such straight edge 51 is also provided with a lateral projection 53 sized and located to fit into the opening 39 in the pivot 14. In the illustrated embodiment, the projection is formed of an elastomeric material having a tapered periphery. When the projection 53 is pressed into the opening 39, a friction fit is provided which retains the straight edge 51 in its mounted position while permitting its easy removal when desired. The notch 52 and the projection 53 cooperate to removably mount the straight edge in direct alignment with the short arm 34 so that it extends past the long arm 10 and permits the measurement of outside corners, as described in greater detail below.

With the basic instrument, all angles between zero and 180 degrees can be accurately measured and, with the addition of the accessory straight edge, outside angles from 180 degrees to 360 degrees can also be measured. Preferably, the straight edge is provided with length measurement indicia along the side from which the projection 53 extends so that the straight edge can be used as a simple measuring device when not used with the basic instrument.

Figure 7:
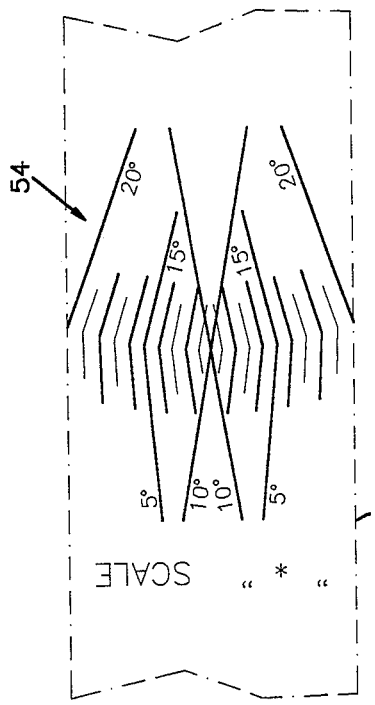
FIG. 7 is an enlarged, fragmentary view illustrating the small-angled scale provided on the long arm of the instrument.

For measuring small angles accurately, an additional scale 54 is provided on the long arm. Such scale, illustrated in FIG. 7, is required because the relative telescoping movement between the two telescoping members 18 and 19 becomes small when the two arms 10 and 11 approach an aligned position. The scale 54 in the illustrated embodiment provides accurate measurement of the angle in degrees between the two arms 10 and 11 through angles up to about 20 degrees in either side of an aligned position. Such scale is read along one or the other of the straight edges 12 or 13 of the short arm 11. For angles approaching 180 degrees, the scale 54 functions in combination with the extension straight edge 51 to again provide accurate angle determination. Once the angle between the two arms 10 and 11 exceeds the 20 degrees measurement provided by the scale 54, the relative movement of the two telescoping members 18 and 19 per degree of change in the angle between the two arms 10 and 11 is sufficient to provide accurate angle reading using the scale 27.

Figure 8:
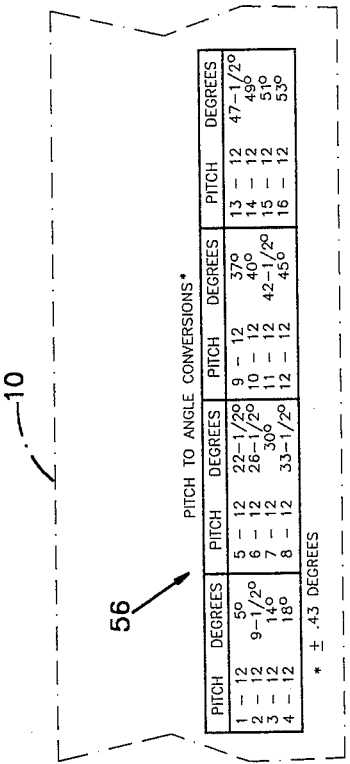
FIG. 8 is an enlarged, fragmentary view illustrating the table of "pitch angles" provided on the long arm of the instrument.

In the illustrated embodiment, the long arm 10 is also provided with a table 56 of pitch angles adjacent to its end remote from the pivot 14 so that the user can quickly determine the setting of the instrument for various customary pitch angles. Such table is illustrated at enlarged scale in FIG. 8.

The illustrated embodiment also provides a lock screw 57 threaded into a tube nut mounted in the telescoping member 18 which can be tightened to lock the instrument in any adjusted position.

Figure 11A:
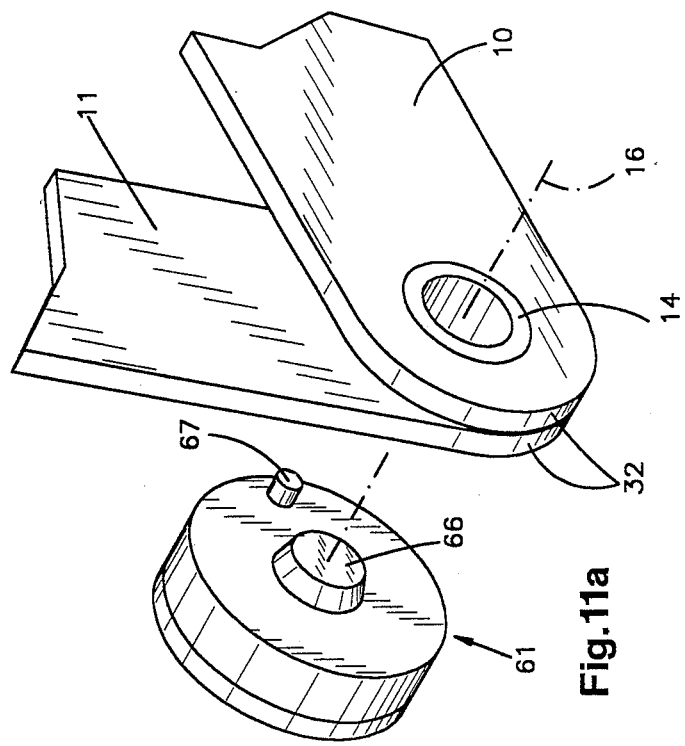
FIG. 11a is another exploded perspective view of the level accessory.
Figure 11:
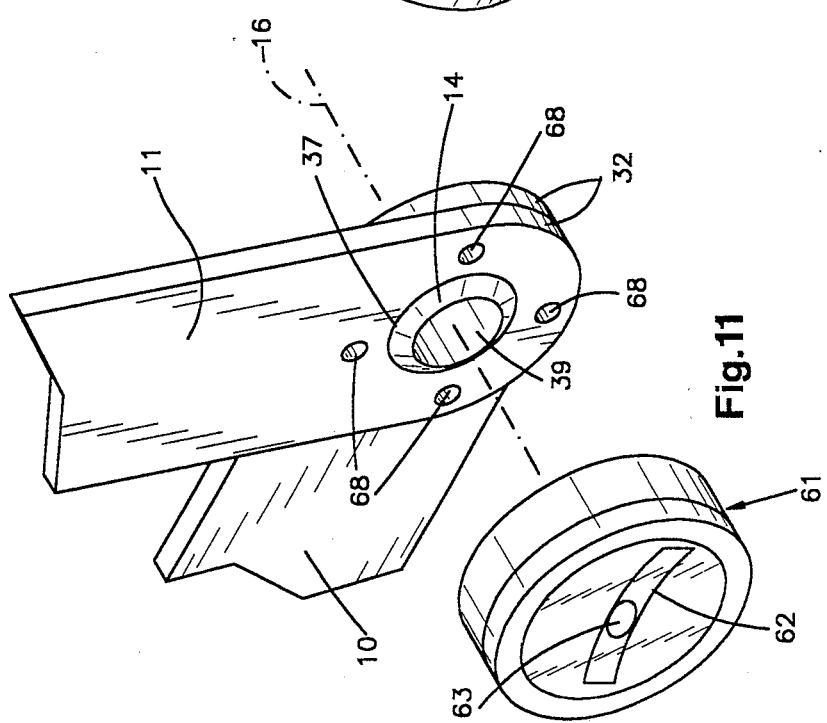
FIG. 11 is an enlarged, exploded perspective view of the level accessory which may be mounted on the instrument.

FIGS. 11 and 11a illustrate a level 61 which may be detachably mounted on the instrument so that the instrument can be used to measure angles with respect to either horizontal or vertical directions. The illustrated level 61 provides a typical spirit level providing a curved sight glass 62 and bubble 63 which is centered to establish a horizontal position. The level provides a circular housing 64 in which the sight glass is mounted.

Projecting from the back of the housing are two projections 66 and 67. The projection 66, like the projection 53 on the straight edge 51, is sized to fit into the central opening 39 in the grommet 37 of the pivot 14 to provide one mounting location for the level. The second projection 67 is spaced from the first projection 66 and is sized and positioned to be selectively positioned in one of four mating openings 68 in the short arm 11 symmetrically positioned around the pivot axis 16 at 90-degree intervals. Therefore, the level can be positioned with respect to the short arm to establish the position of the short arm extending in any one of the four directions from the pivot, including vertically up, vertically down, and horizontally in both directions from the pivot. When the level is mounted on the instrument, it can be used to measure angles from either the horizontal position or the vertical position by merely positioning the short arm in either a horizontal position or a vertical position as established by the level and moving the long arm to the desired angle with respect to such horizontal or vertical directions.

The straight edge 51 is also preferably provided with a similar grommet 51' and symmetrically arranged openings 68' so that the user can, if desired, mount the level 61 on the straight edge and use the straight edge as a level. Here again, the level 61 can be mounted on the straight edge 51 in any one of four positions so that the level can be used accordingly to establish the straight edge in either vertical or horizontal positions.

FIG. 3 is an enlarged view of the telescoping member 18 illustrating the three scales 26, 27, and 28 thereon. It should be noted that the scale 27 of degrees contains degree indicia extending from 20 degrees to 160 degrees to cover the range of angles in which sufficient relative movement occurs between the telescoping assemblies to provide accurate readings. For angles smaller than 20 degrees, the scale 54 is used, as described above, to provide accurate angle readings.

FIGS. 12 through 12b illustrate the use of an instrument in measuring an acute; angle between two parallel planes, such as walls 71 and 72, which intersect at a corner 73. In this illustrated example, the walls 71 and 72 extend at 60 degrees relative to each other and form a 60-degree inside corner. When the instrument is placed at the corner, with the short arm extending along and in engagement with the wall 71, and the long arm 10 extending along and engaging the wall 72, the hairline 31 of the cursor 29 is automatically positioned over the three scales 26, 27, and 28 at a position corresponding to such angle. As illustrated in the enlarged, fragmentary section of FIG. 12a, the hairline indicates a 60-degree angle over the scale 27. The hairline 31 also indicates on the scale that the spacing between the two pivot axes 22 and 24 is 15⅞ inch. Also, the position of the hairline 31 over the scale 28 establishes the location of the corner 73 with respect to the scales 13 on the two arms 10 and 11. In such position, ¾ inch must be added to each of the measurements along the walls 71 and 72 provided by the scales 13 of the two arms to obtain an exact measurement of a given distance from the corner 73. For example, if it is desired to measure the distance along the wall 72, the reading on the scale 13 of the long arm 10 is established. If such reading is, for example, 13 inches, the corner is actually 13 inches plus ¾ inch from the corner, or 13¾ inches from the corner, as indicated by the scale 28. As illustrated in FIG. 3, the scale 28 indicates a positive or (+) offset between 0° and 90 ° and a negative (−) offset between 90 ° and 180°. This scale 28 permits the accurate measurement from corners even though the instrument does not actually engage the corners as best illustrated in FIG. 12b, and automatically provides the information to the user as to how to add or subtract from scale readings to accurately locate the corner.

As illustrated in FIG. 3, the scale 28 is provided with encircled numbers 28a at common angles which indicate the amount to be added or subtracted to establish corner positions. These encircled numbers are rounded off for convenient use.

FIGS. 13. 13a, and 13b illustrate the use of the instrument in measuring an obtuse inside corner of 123 degrees. The two arms 10 and 11 are positioned against the two walls 76 and 77, forming a corner 78 of 123 degrees. As illustrated in FIG. 13a, the angle is directly readable on the hairline 31 on the scale 27 and the distance between the pivots 22 and 24 is readable on the scale 26. The scale 28 establishes that measurements along the two walls using the scale 13 of the two arms should be corrected by subtracting about 7/16 inch to provide an accurate reading.

Figure 14:
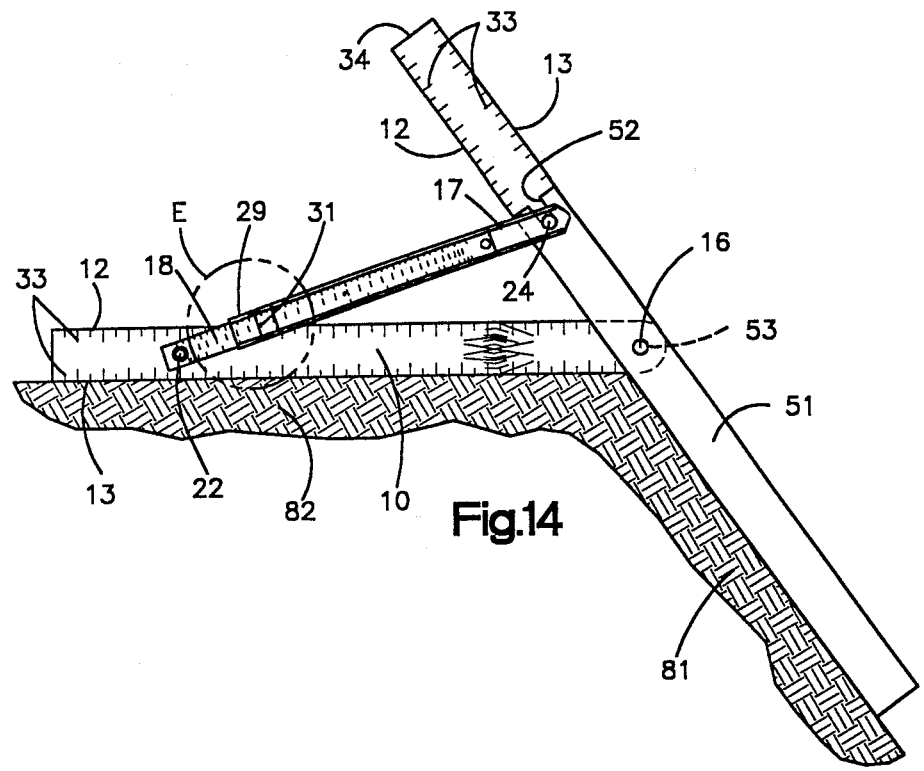
FIG. 14 illustrates the instrument in use to measure an outside corner while employing the straight edge extension.
Figure 14A:
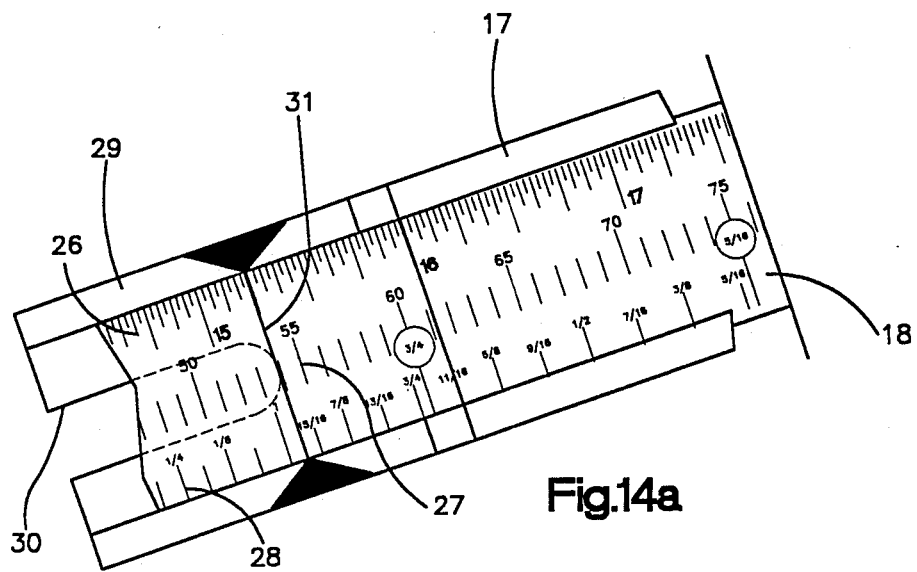
FIG. 14a is an enlarged view of the portion within the circle E of FIG. 14.

FIGS. 14 and 14a illustrate the use of the instrument to measure an outside corner of 234 degrees. In this instance, straight edge 51 is installed on the instrument and is positioned along the wall 81, while the long arm is positioned against the wall 82. As illustrated in FIG. 14a, the hairline is aligned with the degree number 54 on the scale 27. Such angle is added to 180 degrees to give the accurate determination of the outside corner angle. When measuring a distance along the wall 82, as indicated by the scale 13 on the long arm, it is merely necessary to note the position of the corner on such scale and subtract the reading at the corner from the reading at the point being measured.

With this invention, a very accurate, durable, and collapsible instrument is provided permitting accurate field measurements of substantially any inside or outside corner.

Although the preferred embodiment of this invention has been shown and described, it should be understood that various modifications and rearrangements of the parts may be resorted to without departing from the scope of the invention as disclosed and claimed herein.

What is claimed is:

1. An angle measuring instrument comprising first and second elongated arms each having ends and at least one straight side, a first permanent pivot connecting one end of said first arm to one end of said second arm for relative pivotal movement about a first fixed pivot axis, a telescoping assembly providing first and second elongated members connected for relative longitudinal telescoping movement, said first and second members each having a free end, a second permanent pivot connecting said free end of said first member to said first arm for relative pivotal movement about a second fixed pivot axis spaced from said first pivot axis, a third permanent pivot connecting said free end of said second member to said second arm for relative pivotal movement about a third fixed pivot axis spaced from said first pivot axis, scale means on one of said first and second members and a cursor on the other of said first and second member movable along said scale means as said first and second arms pivot around said first pivot axis, said scale and cursor cooperating to indicate the angle between said straight sides of said first and second arms, said second arm extending from said first pivot axis a distance less than the spacing between said first pivot axis and said second pivot axis, said second arm being movable relative to said first arm through 360 degrees and to a folded position overlying said first arm in which said telescoping assembly overlies said first arm.

2. An instrument as set forth in claim 1, wherein said scale means has a length at least substantially equal to two times the distance between said first pivot axis and said third pivot axis.

3. An instrument as set forth in claim 1, wherein said scale includes degree markings cooperating with said cursor to provide a direct reading of the angle between said arms in degrees.

4. An instrument as set forth in claim 1, wherein said scale means includes length markings which cooperate with said cursor to provide a direct reading of the distance between said second and third pivot axes.

5. An instrument as set forth in claim 1, wherein a straight edge is removably mounted on one of said first and second arms and provides at least one straight side aligned with a straight side of said one of said first and second arms, said straight edge permitting measurement of angles of outside corners.

6. An instrument as set forth in claim 1, wherein a level is provided on one of said first and second arms which indicates the position thereof relative to a horizontal direction.

7. An instrument as set forth in claim 6, wherein said level is movable relative to said one of said members between a plurality of positions.

8. An instrument as set forth in claim 6, wherein said level is removably mounted on said instrument.

9. An instrument as set forth in claim 1, including a removable straight edge, said first pivot and straight edge providing releasable first mounting means for connecting said straight edge to said instrument.

10. An instrument as set forth in claim 9, wherein said straight edge and one of said second and third pivots provides second mounting means cooperating with said first mounting means to position said straight edge on said instrument in alignment with one of said arms.

11. An instrument as set forth in claim 9, wherein said first mounting means includes an opening in said first pivot and a projection on said straight edge sized to project into said opening.

12. An angle measuring instrument comprising first and second elongated arms each having ends and at least one straight side, a first pivot connecting one end of said first arm to one end of said second arm for relative pivotal movement about a first pivot axis, a telescoping assembly providing first and second elongated members connected for relative longitudinal telescoping movement, said first and second members each having a free end, a second pivot connecting said free end of said first member to said first arm for relative pivotal movement about a second pivot axis spaced from said first pivot axis, a third pivot connecting said free end of said second member to said second arm for relative pivotal movement about a third pivot axis spaced from said first pivot axis, scale means on one of said first and second members and a cursor on the other of said first and second member movable along said scale means as said first and second arms pivot around said first pivot axis, said scale and cursor cooperating to indicate the angle between said straight sides of said first and second arms, said first and second arms providing length indicia establishing the distance along each of them from said one ends thereof, said scale means providing a scale indicating corrections to be used with said indicia to establish distances from a corner being measured.

13. An instrument as set forth in claim 12, wherein each of said first and second arms has opposed and parallel straight sides equally spaced on opposite sides of said first pivot axis and the associated of said second and third pivot axes.

14. An instrument as set forth in claim 13, wherein said one ends of said first and second arms are semicircles having a center of curvature coincident with said first axis and a radius of curvature equal to the spacing between said first axis and said opposed parallel straight sides.

15. An instrument as set forth in claim 13, wherein said first and second arms are pivotally movable relative to each other through 360 degrees.

16. An instrument as set forth in claim 15, wherein said first and second arms provide said indicia along each of said parallel straight sides.

17. An instrument as set forth in claim 16, wherein said one end of at least one of said first and second arms is a semicircle having a center of curvature coincident with said first pivot axis and a radius of curvature equal to the spacing between said first pivot axis and said opposed and parallel straight sides.

18. An angle measuring instrument comprising a pair of elongated arms each having ends, a permanent pivot connecting one end of each of said arms for relative pivotal movement about a first fixed pivot axis, a telescoping assembly providing telescoping members permanently connected between both of said arms at fixed locations spaced from said first pivot axis, relative pivotal movement between said arms about said first pivot axis causing telescoping movement of said members, said telescoping assembly providing first scale indicia indicating the angle between said arms when said arms are in position angled substantially from positions of alignment, one of said arms providing a separate second scale indicia on the surface of said one arm for establishing the angle between said arms when said arms approach positions of alignment.

19. An instrument as set forth in claim 18, wherein said arms are free for pivotal relative movement through a full 360 degrees.

20. An instrument as set forth in claim 18, including a level for indicating the position of one of said arms with respect to a horizontal direction.

* * * * *